(12) United States Patent
Li

(10) Patent No.: US 10,599,193 B2
(45) Date of Patent: Mar. 24, 2020

(54) ELECTRONICAL DEVICE

(71) Applicant: Lenovo (Beijing) Co., Ltd., Beijing (CN)

(72) Inventor: Huaqiao Li, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/370,807

(22) Filed: Mar. 29, 2019

(65) Prior Publication Data

US 2019/0302856 A1 Oct. 3, 2019

(30) Foreign Application Priority Data

Mar. 30, 2018 (CN) .......................... 2018 1 0278044

(51) Int. Cl.
*G06F 1/16* (2006.01)
*H01Q 1/22* (2006.01)

(52) U.S. Cl.
CPC ......... *G06F 1/1698* (2013.01); *H01Q 1/2266* (2013.01)

(58) Field of Classification Search
CPC ...... G06F 1/1613; G06F 1/162; G06F 1/1656; G06F 1/1683; G06F 1/1698; H01Q 1/2258; H01Q 1/242; H01Q 1/2266
USPC ............ 361/679.01, 679.02, 679.26, 679.27; 343/720, 767, 770, 872
See application file for complete search history.

(56) References Cited

U.S. PATENT DOCUMENTS

| | | | | |
|---|---|---|---|---|
| 6,414,642 B2* | 7/2002 | Honda | ................... | H01Q 1/243 343/702 |
| 6,853,336 B2* | 2/2005 | Asano | ................. | H01Q 1/2266 343/702 |
| 7,072,690 B2* | 7/2006 | Shin | ...................... | G06F 1/1616 455/557 |
| 7,167,726 B2* | 1/2007 | Ghosh | ................... | G06F 1/1616 455/557 |
| 7,433,725 B2* | 10/2008 | Lin | ........................ | H01Q 1/38 343/700 MS |
| 7,768,472 B2* | 8/2010 | Hardacker | ............... | H01Q 1/12 343/872 |
| 8,310,825 B2* | 11/2012 | Schlesener | ............ | G06F 1/1616 343/702 |
| 8,773,310 B2* | 7/2014 | Shiu | ..................... | B23K 1/0016 343/700 MS |
| 9,450,292 B2* | 9/2016 | Irci | ........................ | H01Q 1/243 |
| 9,535,462 B2* | 1/2017 | Watabe | ................. | G06F 1/1656 |
| 2002/0021250 A1* | 2/2002 | Asano | ................. | H01Q 1/2266 343/702 |
| 2003/0076266 A1* | 4/2003 | Schaffer | .................. | G06F 1/181 343/702 |
| 2006/0050000 A1* | 3/2006 | Hirabayashi | ......... | H01Q 1/2275 343/725 |

(Continued)

*Primary Examiner* — Anthony Q Edwards
(74) *Attorney, Agent, or Firm* — Anova Law Group, PLLC

(57) ABSTRACT

The present disclosure provides an electronic device with a metal housing that includes a main body portion and a separated portion. The separated portion is connected to the main body portion by plastic to form an accommodating space of the metal housing. The side walls of the main body portion have a slit extending from a first side wall to a second side wall. The separated portion is suspended in the slit and connected to the main body portion by the plastic.

20 Claims, 3 Drawing Sheets

(56) References Cited

U.S. PATENT DOCUMENTS

| | | | |
|---|---|---|---|
| 2006/0061512 A1* | 3/2006 | Asano | G06F 1/1616 343/702 |
| 2011/0006953 A1* | 1/2011 | Chiang | G06F 1/1616 343/702 |
| 2011/0115735 A1* | 5/2011 | Lev | G06F 1/1616 345/173 |
| 2012/0050123 A1* | 3/2012 | Wang | H01Q 1/2266 343/767 |
| 2012/0133560 A1* | 5/2012 | Tang | G06F 1/1626 343/702 |
| 2012/0155005 A1* | 6/2012 | Lee | G06F 1/162 361/679.26 |
| 2015/0270619 A1* | 9/2015 | Zhu | G01V 3/00 343/702 |
| 2017/0373374 A1* | 12/2017 | Moon | H01Q 15/14 |
| 2018/0131091 A1* | 5/2018 | Chang | H01Q 13/106 |
| 2018/0366811 A1* | 12/2018 | Huang | H01Q 1/243 |
| 2019/0051971 A1* | 2/2019 | Hsieh | H04B 1/3838 |
| 2019/0053390 A1* | 2/2019 | Lin | G05B 19/40937 |
| 2019/0153583 A1* | 5/2019 | Zhou | C23C 14/025 |

* cited by examiner

ELECTRONICAL DEVICE

CROSS-REFERENCES TO RELATED APPLICATIONS

This application claims the priority to Chinese Patent Application No. 201810278044.9, entitled "Electronic Device," filed on Mar. 30, 2018, the entire content of which is incorporated herein by reference.

FIELD OF TECHNOLOGY

The present disclosure relates to the field of communication. More specifically, the present disclosure relates to an electronic device.

BACKGROUND

With the advancement in technology, electronic devices such as mobile phones and computers have become an indispensable part in people's daily life both at work and in school. However, the housing designs of mobile phones, computers and other electronic devices currently available on the market are relatively simple and unable to meet people's needs.

Correspondingly, due to the limit in housing designs of the electronic devices, the antenna of the existing notebook computers on the market is typically disposed in the housing of the system or the display. When the housing is made of metal, the metal housing has a shielding effect on the antenna disposed therein, which weakens the signals transmitted and received by antenna. To reduce the shielding effect on the antenna in the metal housing, it is necessary to reserve a certain clearance area (or clearance space) in the metal housing for the antenna, which negatively affects the user experience.

BRIEF SUMMARY OF THE DISCLOSURE

Embodiments of the present disclosure provide an electronic device with improved housing design to overcome the problems set forth above.

One aspect of the present disclosure provides an electronic device. The electronic device includes a metal housing having a main body portion and a separated portion. The separated portion is connected to the main body portion by plastic to form an accommodating space of the metal housing. Further, the side walls of the main body portion have a slit extending from a first side wall to a second side wall, and the separated portion is suspended in the slit and connected to the main body portion by the plastic.

In one embodiment, the shape of the separated portion may be consistent with the shape of the slit.

In one embodiment, the electronic device may further include an antenna, and the separated portion of the metal housing may be a radiator of the antenna. Further, the plastic connecting the separated portion and the main body portion may reduce interference of the main body portion on the separated portion.

In one embodiment, the electronic device may further include a first main body, and the metal housing may be a second main body of the electronic device. Further, the first main body may be connected to the second main body by a rotating connection member, and the slit may be disposed on the second main body away from a first side wall of the connection member and a second side wall adjacent to the first side wall.

In one embodiment, the slit may further include a first slit and a second slit. The first slit may extend from the first side wall of the second main body away from the connection member to the second side wall adjacent to the first side wall, the second slit may extend from the first side wall of the second main body away from the connection member to a third side wall adjacent to the first side wall, and the second side wall may be opposite to the third side wall. Further, the separated portion may further include a first separated portion and a second separated portion. The first separated portion may be suspended in the first slit and fixed to the main body portion by the plastic, and the shape of the first separated portion may be consistent with the shape of the first slit. The second separated portion may be suspended in the second slit and fixed to the main body portion by plastic, and the shape of the second separated portion may be consistent with the shape of the second slit.

In one embodiment, electronic device may further include a plurality of matching circuits connected to the separated portion. When the separated portion of the metal housing is in the operating state as the radiator of the antenna, the matching circuits may control the operating frequency band of the separated portion.

In one embodiment, different matching circuits may correspond to different operating frequencies, different matching circuits may correspond to different separated portions, or the same separated portion.

In one embodiment, the plastic between the main body portion and the separated portion may be formed by a nano-injection molding process.

In one embodiment, the plastic between the main body portion and the separated portion formed using the nano-injection molding process may connect the main body portion and the separated portion with rigidity.

Another aspect of the present disclosure provides a mechanical device with a metal housing having a main body portion and a separated portion. The separated portion is connected to the main body portion by plastic to form an accommodating space of the metal housing. Further, the side walls of the main body portion have a slit extending from a first side wall to a second side wall, and the separated portion is suspended in the slit and connected to the main body portion by the plastic.

Another aspect of the present disclosure provides a device with a metal housing and an antenna. The metal housing includes a main body portion and a separated portion. The separated portion is connected to the main body portion by plastic to form an accommodating space of the metal housing. Further, the side walls of the main body portion have a slit extending from a first side wall to a second side wall, and the separated portion is suspended in the slit and connected to the main body portion by the plastic.

The embodiments of the present disclosure provide an electronic device and other devices with a metal housing that includes a main body portion and a separated portion, the separated portion being connected to the main body portion by plastic to form an accommodating space of the metal housing; the side walls of the main body portion have a slit extending from a first side wall to a second side wall, and the separated portion is suspended in the slit and connected to the main body portion by the plastic. The electronic device provided in the present disclosure has an improved housing design as the separated portion can be adjusted to increase the scalability and usability of the metal housing. When the separated portion is used as a radiator of an antenna, in one example, the user's hands would not completely cover the separated portion (i.e., the radiator of the antenna), thereby reducing the impact on the performance of the antenna and improving the user experience.

BRIEF DESCRIPTION OF THE DRAWINGS

For a more complete understanding of the present disclosure, and the advantages thereof, reference is now made to the following descriptions to be taken in conjunction with the accompanying drawings. The accompanying drawings in the following description show merely some embodiments of the present invention, and a person of ordinary skill in the art may still derive other drawings from these accompanying drawings without creative efforts.

DETAILED DESCRIPTION

Hereinafter, aspects, features, and embodiments of the present disclosure will be described with reference to the accompanying drawings. It should be understood that such description is exemplary only but is not intended to limit the scope of the present disclosure. In addition, it will be understood by those skilled in the art that various modifications in form and details may be made therein without departing from the spirit and scope of the present disclosure.

Features and aspects of the present disclosure will become apparent with reference to the accompanying drawings and non-limiting examples describing various preferred embodiments of the present disclosure.

It will also be appreciated that although the present disclosure has been described with reference to some specific examples, equivalents of the present disclosure can be achieved by those skilled in the art. These equivalents having features claimed in the present disclosure should fall within the scope of protection defined hereinafter.

Hereinafter, embodiments of the present disclosure will be described with reference to the accompanying drawings. It should be understood that such description is exemplary only but is not intended to limit the scope of the present disclosure. In addition, in the following description, descriptions of well-known structures and techniques are omitted to avoid unnecessarily obscuring the concepts of the present disclosure. Therefore, specific structural and functional details disclosed herein are not intended to be limiting, but are merely used as a basis of the claims to teach those skilled in the art to use the present disclosure in various combinations.

The terms used herein is for the purpose of describing particular embodiments only but is not intended to limit the present disclosure. The words "a", "an" and "the" as used herein should also cover the meanings of "a plurality of" and "a variety of", unless the context clearly dictates otherwise. In addition, the terms "comprising", "including", "containing" and the like as used herein indicate the presence of the features, steps, operations and/or components, but do not preclude the presence or addition of one or more other features, steps, operations or components.

The phrases "in an embodiment", "in another embodiment", "in another embodiment", or "in other embodiments" may refer to the same or different embodiments accordingly to the present disclosure.

The accompanying drawings illustrating embodiments of the present disclosure along with the summary of disclosure provided above and the detailed description provided below serve to explain the concepts of the present disclosure.

Figure 1:
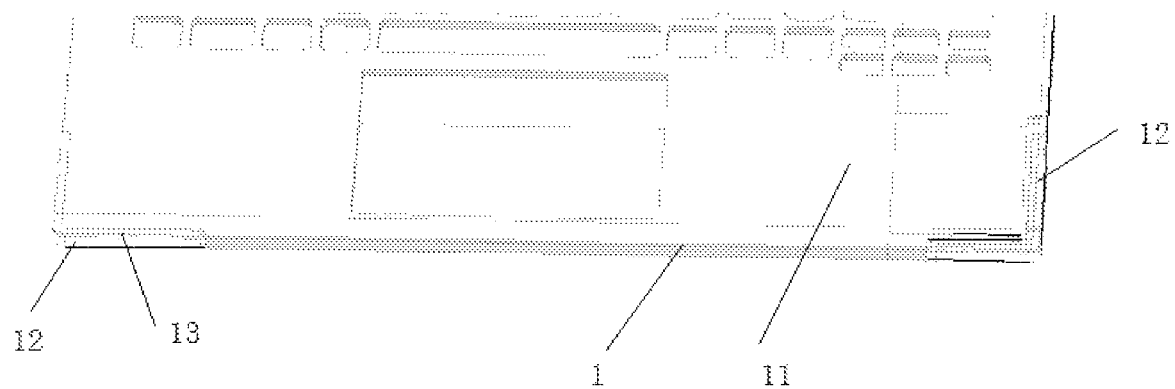
FIG. 1 is a structural diagram of an electronic device according to an embodiment of the present disclosure.
Figure 2:
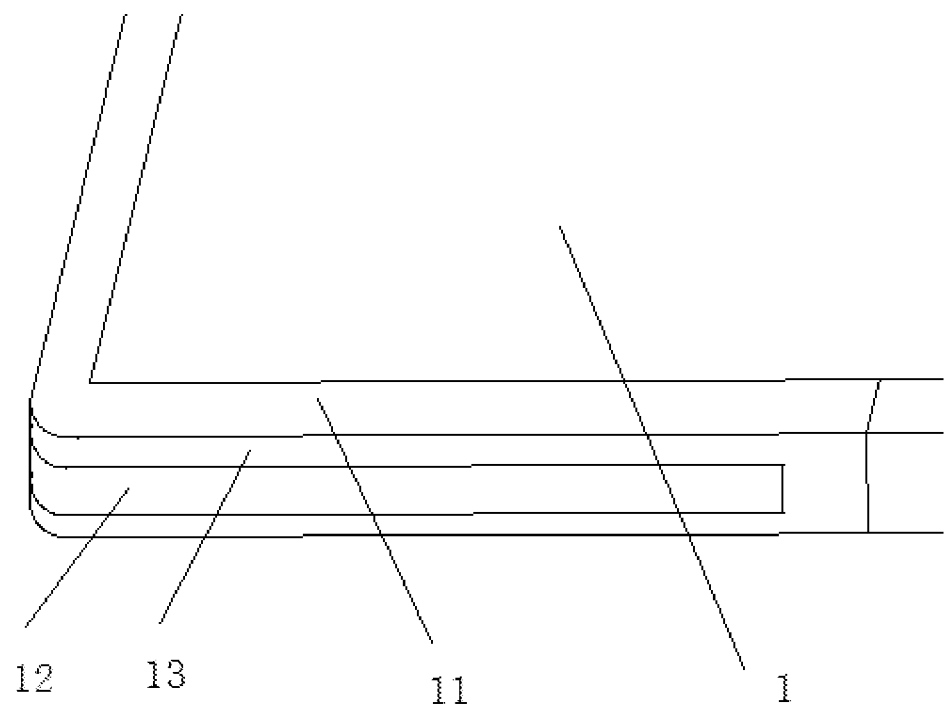
FIG. 2 is a partial structural diagram of the electronic device according to an embodiment of the present disclosure.

The present disclosure provides an electronic device as shown in FIG. 1 and FIG. 2. FIG. 1 is a structural diagram of an electronic device according to an embodiment of the present disclosure. The electronic device includes:

A metal housing 1, which may include a main body portion 11 and a separated portion 12. The separated portion 12 may be fixedly connected to the main body portion 11 by plastic 13 to form an accommodating space of the metal housing. Further, the side walls of main body portion may have a slit extending from a first side wall to a second side wall, and the separated portion 12 may be suspended in the slit and fixed to the main body portion 11 by the plastic 13.

The embodiment above provides an electronic device with a metal housing that may include a main body portion and a separated portion, the separated portion may be connected to the main body portion by plastic to form an accommodating space of the metal housing, the side walls of main body portion have a slit extending from a first side wall to a second side wall, and the separated portion may be suspended in the slit and fixed to the main body portion by the plastic. The electronic device provided in the present embodiment has an improved housing design as the separated portion may be adjusted to increase the scalability and usability of the metal housing.

For example, the separated portion 12 may be designed as an antenna, which may not be easily blocked by the user's hands to yield better performance. Or, the separated portion 12 may also be designed as speaker to yield better sound effect.

Further, the plastic 13 may be used to fixedly connect the main body portion 11 and the separated portion 12.

In one embodiment, the shape of the separated portion 12 may be consistent with the shape of the slit, so the separated portion may be designed based on the shape of the slit to improve the overall design of the metal housing.

In one embodiment, the electronic device may further include an antenna, and the separated portion 12 of the metal housing 1 may function as a radiator of the antenna. Further, if the separated portion 12 of the metal housing 1 is in an operating state as the radiator of the antenna, the plastic 13 used to connect the separated portion 12 and the main body portion 11 may function as a partition member to reduce the impact of the main body portion on the separated portion 12.

Further, the electronic device may be a notebook computer, a mobile phone, a tablet, etc. Correspondingly, when the separated portion is used as the radiator of the antenna, the radiator of the antenna may be extended from the first side wall to the second side wall of the electronic device. Under this design, when using the electronic device, the user's hands would not easily block the separated portion 12 (i.e., the radiator of the antenna), thus, the impact on the antenna performance will be minimized and the user's experience will be improved.

Furthermore, the plastic 13 may be used as the partition member to prevent the main body portion 11 from interfering with the performance of the separating portion 12 (i.e., the radiator of the antenna).

In one embodiment, the electronic device may further include a first main body, and the metal housing 1 may be a second main body of the electronic device. Further, the first main body may be movably connected to the second main body by a rotating connection member, and the slit may be disposed on the second main body away from a first side wall of the rotating connection member and a second side wall adjacent to the first side wall.

The movable connection between the first main body and the second main body through the rotating connection member may be at any range of angles between 0°-360° relative to the rotation. For example, a relative rotation may be 0°-180°, 0°-100°, or 0°-360°, etc., and is not explicitly defined here.

In order to understand the embodiment set forth above, the following description is provided below using a notebook computer as the electronic device as an example.

A notebook computer may include a system portion and a display portion, and the display portion may be rotated relative to the system portion by a rotating connection member. In this example, the metal housing 1 may be the housing of the system portion of the notebook computer. Correspondingly, the slit may be disposed on the system portion away from a first side wall of the rotating connection member and a second side wall adjacent to the first side wall. In one use case, a user may be using the notebook computer on a desktop, and the slit may be on the first side wall of the system portion adjacent to the user and the second side wall adjacent to the first side wall.

In another use case, the user may fold the display portion of the notebook computer 360° relative to the system portion, that is, the user may be using the notebook computer as a tablet. While holding the folded notebook computer with both hands to watch a video or using video chat, the user's hands may not completely block the separated portion 12 (i.e., the radiator of the antenna) disposed in the slit, so the antenna of the notebook computer may maintain a good use performance to improve the user experience.

In one embodiment, the slit may further include a first slit and a second slit. The first slit may extend from the first side wall of the second main body away from the rotating connection member to the second side wall adjacent to the first side wall, the second slit may extend from the first side wall of the second main body away from the rotating connection member to a third side wall adjacent to the first side wall, and the first side wall may be opposite to the second side wall. Further, the separated portion 12 may further include a first separated portion and a second separated portion. The first separated portion may be suspended in the first slit and fixed to the main body portion 11 by the plastic 13, and the shape of the first separated portion may be consistent with the shape of the first slit. The second separated portion may be suspended in the second slit and fixed to the main body portion 11 by plastic 13, and the shape of the second separated portion may be consistent with the shape of the second slit.

In particular, the plastic 13 may be directly fixedly connected to the main body portion 11, and may be directly fixedly connected to the main body portion 11 by injection molding. The separated portion 12 may be fixedly connected to the main body portion 11 by the plastic 13 after being wrapped by the plastic 13, and plastic 13 itself may have a joint for securing the separated portion 12, so that the separated portion 12 may be secured to the plastic 13 in an embedded manner. Further, the plastic 13 may have a hollow structure, and the hollow structure may be capable of fixedly connecting the main body portion 11 and the separation portion 12.

In order to understand the embodiment set forth above, the following description is provided below using a notebook computer as the electronic device as an example.

The system portion of the notebook computer may have two slits. The first slit may extend from the first side wall of the system portion away from the rotating connection member to the second side wall adjacent to the first side wall. The second slit may extend from the first side wall of the system portion away from the rotating connection member to the third side wall adjacent to the first side wall. Further, the second side wall may be opposite to the third side wall.

In one use case, a user may be using the notebook computer on a desktop, the first slit may extend from the first side wall of the system portion adjacent to the user to the second side wall adjacent to the first side wall, and the second slit may extend from the first side wall of the system portion adjacent to the user to the third side wall adjacent to the first side wall.

Further, when the separated portion 12 functions as the radiator of the antenna of the notebook computer, the radiator may include a first radiator and a second radiator. The first radiator may be suspended in the first slit and fixed to the main body portion 11 by the plastic 13, and the shape of the first radiator may be consistent with the shape of the first slit. The second radiator may be suspended in the second slit and fixed to the main body portion 11 by the plastic 13, and the shape of the first radiator may be consistent with the shape of the first slit.

Using the radiator design set forth above, a user may fold the display portion of the notebook computer relative to the system portion by certain degree (such as 180°, 270°, 360°, etc.). While holding the folded notebook computer with both hands to watch a video or using video chat, the user's hands may not completely block the radiators disposed in the slits, so the antenna of the notebook computer may maintain a good use performance to improve the user experience.

Figure 3:
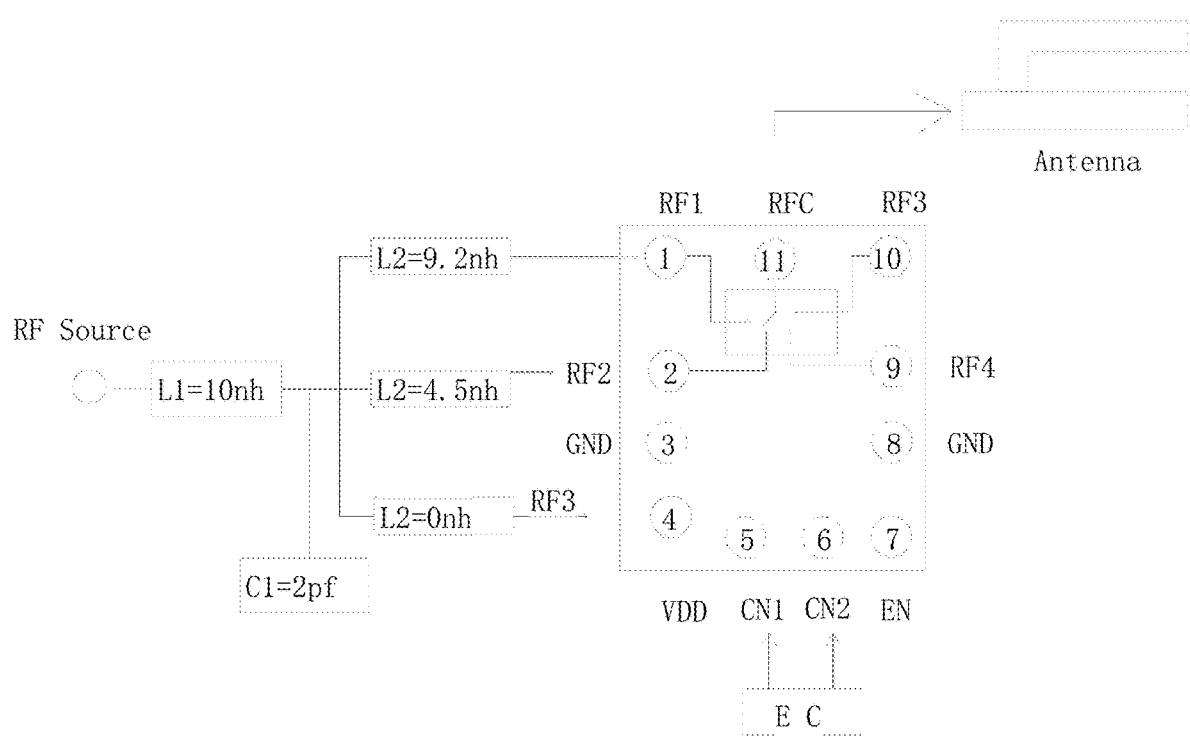
FIG. 3 is a schematic of a matching circuit according to an embodiment of the present disclosure.

FIG. 3 is a schematic of a matching circuit according to an embodiment of the present disclosure.

In one embodiment, electronic device may further include a matching circuit connected to the separated portion. If the separated portion of the metal housing is in the operating state as the radiator of the antenna, the matching circuit may control the operating frequency band of the separated portion.

More specifically, when the antenna is operating in different frequency bands, the matching circuit may control the operating frequency of the separated portion 12 to accommodate different frequency bands, so the antenna of the notebook computer may maintain a good use performance to improve the user experience.

Figure 4:
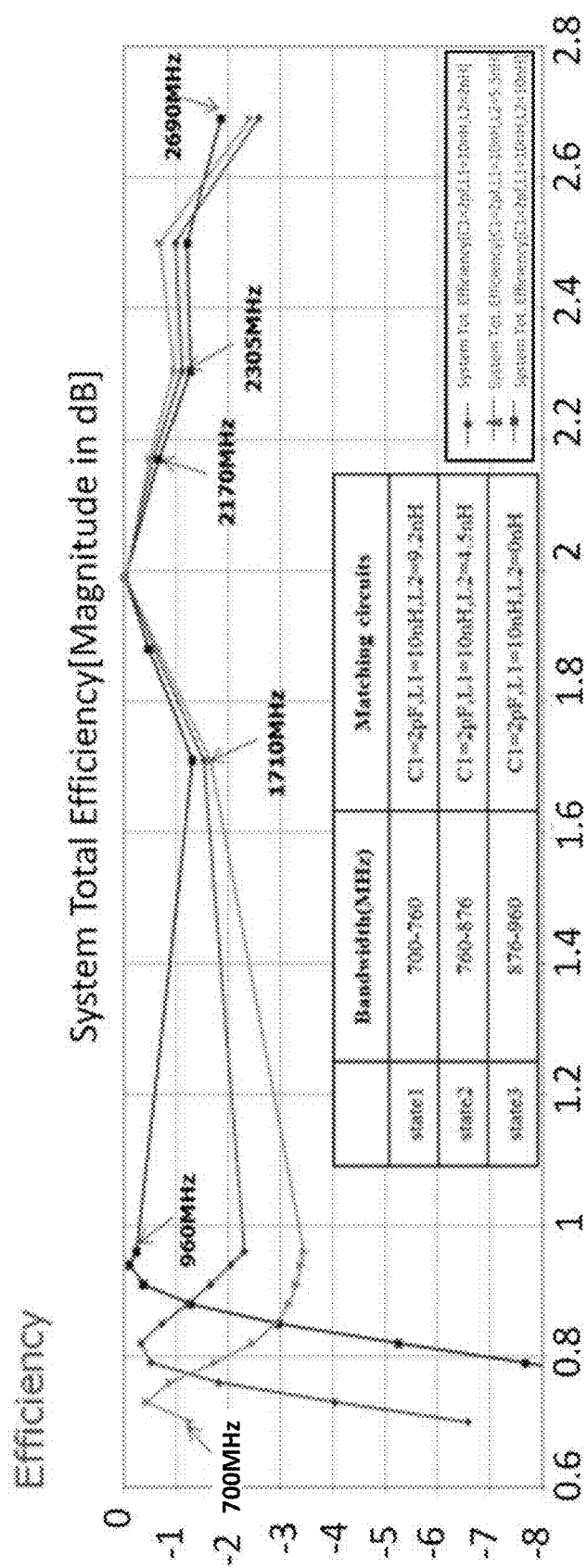
FIG. 4 is a performance test diagram of an antenna after adding the matching circuit and using the separated portion as a radiator of the antenna according to an embodiment of the present disclosure.

FIG. 4 is a performance test diagram of an antenna after adding the matching circuit and using the separated portion as a radiator of the antenna according to an embodiment of the present disclosure.

In one embodiment, different matching circuits may correspond to different operating frequencies, different matching circuits may correspond to different separated portions, or different matching circuits may correspond to the same separated portion.

That is, when detecting the antenna is operating in different frequency bands, the antenna and the radiator of the electronic device may be adapted to continue working in the current frequency band by switching the matching circuit and simultaneously switching the separate portion. Further, when detecting the antenna is operating in different frequency bands, the antenna and the radiator of the electronic device may be adapted to continue working in the current frequency band by adjusting the matching circuit without switching the separated portion.

In one embodiment, the plastic 13 between the main body portion 11 and the separated portion 12 may be formed using a nano-injection molding process.

More specifically, the nano-injection molding process involves the process of performing a nano-treatment on a metal surface, injecting the plastic 13 onto the metal surface, and combining the metal such as magnesium, stainless steel, titanium with hard resin to form an integrated molding. Under this process, the plastic 13 will be highly adhesive when connecting with the main body portion 11 of the electronic device, and can effectively reduce the number of man-hours in operation. In addition, the overall weight of the metal housing of the electronic device may be reduced, the aesthetic appearance of the metal housing may be maintained, and the environmental pollution may be minimized.

In one embodiment, the plastic 13 between the main body portion 11 and the separated portion 12 formed using the nano-injection molding process may have a certain rigidity to fix the main body portion and the separated portion.

That is, the plastic formed by the nano-injection molding process has a good rigidity, and plastic materials with certain rigidity such as hard resin may be used to ensure the bonding strength between the main body portion and the separated portion.

Those skilled in the art may clearly understand that, for ease and concision of the descriptions, the aforementioned processing method may be applied to the related electronic devices, and the related details may refer to corresponding descriptions in the disclosed embodiments, which are not repeated herein.

The embodiments in this specification are described in a progressive manner, each embodiment emphasizes a difference from the other embodiments, and the identical or similar parts between the embodiments may be made reference to each other. Since the apparatuses disclosed in the embodiments are corresponding to the methods disclosed in the embodiments, the description of the apparatuses is simple and relevant parts may be made reference to the description of the methods.

Persons skilled in the art may further realize that, units and steps of algorithms according to the description of the embodiments disclosed by the present disclosure can be implemented by electronic hardware, computer software, or a combination of the two. In order to describe interchangeability of hardware and software clearly, compositions and steps of the embodiments are generally described according to functions in the forgoing description. Whether these functions are executed by hardware or software depends upon specific applications and design constraints of the technical solutions. Persons skilled in the art may use different methods for each specific application to implement the described functions, and such implementation should not be construed as a departure from the scope of the present disclosure.

The steps of the methods or algorithms described in the embodiments of the present disclosure may be directly implemented by hardware, software modules executed by the processor, or a combination of both. The software module can be placed in a random access memory (RAM), memory, read only memory (ROM), electrically programmable ROM, electrically erasable and programmable ROM, register, hard disk, mobile disk, CD-ROM, or any other form of storage medium known to the technical domain.

It will be understood by those skilled in the art that the features described in the respective embodiments and/or claims of the present disclosure can be combined in various ways, even if such combinations are not explicitly described in the present disclosure. In particular, without departing from the spirit and teaching of the present disclosure, the features described in the respective embodiments and/or claims can be combined in various ways. All of these combinations fall within the scope of the present disclosure.

While the present disclosure has been shown and described with reference to various embodiments thereof, it will be understood by those skilled in the art that various modifications in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

It should be noted that the description of the foregoing embodiments of the electronic device may be similar to that of the foregoing method embodiments, and the device embodiments have the same beneficial effects as those of the method embodiments. Therefore, details may not be described herein again. For technical details not disclosed in the embodiments of the electronic device of the present disclosure, those skilled in the art may understand according to the method embodiments of the present disclosure.

In the several embodiments provided in the present disclosure, it should be understood that the disclosed device and method may be realized in other manners. The device embodiments described above are merely exemplary. All functional modules or units in the embodiments of the present disclosure may all be integrated in one processing unit, or each unit may be used as a single unit. Two or more units may be integrated in one. The above integrated unit can either be implemented in the form of hardware, or in the form of hardware combined with software functional units.

Persons of ordinary skill in the art should understand that, all or a part of steps of implementing the foregoing method embodiments may be implemented by related hardware of a computer instruction program. The instruction program may be stored in a computer-readable storage medium, and when executed, a processor executes the steps of the above method embodiments as stated above. The foregoing storage medium may include various types of storage media, such as a removable storage device, a read only memory (ROM), a random-access memory (RAM), a magnetic disk, or any media that stores program code.

Alternatively, when the above-mentioned integrated units of the present disclosure are implemented in the form of a software functional module being sold or used as an independent product, the integrated unit may also be stored in a computer-readable storage medium. Based on this understanding, the technical solutions provided by the embodiments of the present disclosure essentially or partially may be embodied in the form of a software product stored in a storage medium. The storage medium stores instructions which are executed by a computer device (which may be a personal computer, a server, a network device, or the like) to realize all or a part of the embodiments of the present disclosure. The above-mentioned storage medium may include various media capable of storing program codes, such as a removable storage device, a read only memory (ROM), a random-access memory (RAM), a magnetic disk, or an optical disk.

Logics implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

The foregoing descriptions are merely embodiments of the present disclosure, and the protection scope of the present disclosure is not limited thereto. The scope that anyone skilled in the art may easily conceive changes and substitutions within the technical scope disclosed in the present disclosure that should be covered by the present disclosure. Therefore, the protection scope of the present disclosure should be subject to the scope of the claims as listed in the following.

Other embodiments of the disclosure will be apparent to those skilled in the art from consideration of the specification and practice of the disclosure provided herein. It is intended that the specification and examples be considered as exemplary only, with a true scope and spirit of the disclosure being indicated by the claims.

What is claimed is:

1. An electronic device, comprising:
  a metal housing having a main body portion and a separated portion, the separated portion being connected to the main body portion by plastic to form an accommodating space of the metal housing, the main body portion having a slit extending from a first side wall to a second side wall, and the separated portion being suspended in the slit and connected to the main body portion by the plastic.

2. The electronic device according to claim 1, wherein the shape of the separated portion is consistent with the shape of the slit.

3. The electronic device according to claim 1, wherein the separated portion of the metal housing is a radiator of the antenna; and the plastic connecting the separated portion and the main body portion reduces interference of the main body portion on the separated portion.

4. The electronic device according to claim 3, further including a first main body, wherein the metal housing is a second main body of the electronic device; the first main body is connected to the second main body by a rotating connection member; and the slit is disposed on the second main body away from a first side wall of the connection member and a second side wall adjacent to the first side wall.

5. The electronic device according to claim 4, wherein the slit includes a first slit and a second slit, the first slit extending from the first side wall of the second main body away from the connection member to the second side wall adjacent to the first side wall, the second slit extending from the first side wall of the second main body away from the connection member to a third side wall adjacent to the first side wall; the second side wall being opposite to the third side wall; and
  the separated portion includes a first separated portion and a second separated portion, the first separated portion being suspended in the first slit and fixed to the main body portion by the plastic, and the shape of the first separated portion being consistent with the shape of the first slit; the second separated portion being suspended in the second slit and fixed to the main body portion by plastic, and the shape of the second separated portion being consistent with the shape of the second slit.

6. The electronic device according to claim 3, wherein the electronic device further includes a plurality of matching circuits connected to the separated portion, the matching circuits controlling the operating frequency band of the separated portion.

7. The electronic device according to claim 6, wherein different matching circuits correspond to different operating frequencies.

8. The electronic device of claim 1, the plastic between the main body portion and the separated portion is formed by a nano-injection molding process.

9. The electronic device of claim 8, wherein the plastic between the main body portion and the separated portion formed using the nano-injection molding process connects the main body portion and the separated portion with rigidity.

10. A mechanical device with a metal housing, comprising:
  a main body portion and a separated portion, the separated portion being connected to the main body portion by plastic to form an accommodating space of the metal housing, the main body portion having a slit extending from a first side wall to a second side wall, and the separated portion being suspended in the slit and connected to the main body portion by the plastic.

11. The mechanical device according to claim 10, wherein the shape of the separated portion is consistent with the shape of the slit.

12. The mechanical device according to claim 10, wherein the separated portion of the metal housing is a radiator of the antenna; and the plastic connecting the separated portion and the main body portion reduces interference of the main body portion on the separated portion.

13. The mechanical device according to claim 12, wherein the mechanical device further includes a first main body, and the metal housing is a second main body of the mechanical device; the first main body being connected to the second main body by a rotating connection member, and the slit being disposed on the second main body away from a first side wall of the connection member and a second side wall adjacent to the first side wall.

14. The mechanical device according to claim 13, wherein the slit includes a first slit and a second slit, the first slit extending from the first side wall of the second main body away from the connection member to the second side wall adjacent to the first side wall, the second slit extending from the first side wall of the second main body away from the connection member to a third side wall adjacent to the first side wall; the second side wall being opposite to the third side wall; and
  the separated portion includes a first separated portion and a second separated portion; the first separated portion being suspended in the first slit and fixed to the main body portion by the plastic, and the shape of the first separated portion being consistent with the shape of the first slit; the second separated portion being suspended in the second slit and fixed to the main body portion by plastic, and the shape of the second separated portion being consistent with the shape of the second slit.

15. The mechanical device according to claim 12, wherein the mechanical device further includes a plurality of matching circuits connected to the separated portion, the matching circuits controlling the operating frequency band of the separated portion.

16. The mechanical device according to claim 15, wherein different matching circuits correspond to different matching circuits correspond to different separated portions, or the same separated portion.

17. The mechanical device of claim 10, the plastic between the main body portion and the separated portion is formed by a nano-injection molding process.

18. A device with a metal housing and an antenna, comprising:
   a main body portion and a separated portion, the separated portion being connected to the main body portion by plastic to form an accommodating space of the metal housing, the side walls of the main body portion having a slit extending from a first side wall to a second side wall, and the separated portion being suspended in the slit and connected to the main body portion by the plastic.

19. The device according to claim 18, wherein the shape of the separated portion is consistent with the shape of the slit.

20. The device according to claim 18, wherein the separated portion of the metal housing is a radiator of the antenna; and the plastic connecting the separated portion and the main body portion reduces interference of the main body portion on the separated portion.

* * * * *